(12) United States Patent
Ishii

(10) Patent No.: US 8,774,507 B2
(45) Date of Patent: Jul. 8, 2014

(54) IMAGE PROCESSING DEVICE AND IMAGE PROCESSING METHOD TO CALCULATE A COLOR CORRECTION CONDITION

(71) Applicant: Canon Kabushiki Kaisha, Tokyo (JP)

(72) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/846,438

(22) Filed: Mar. 18, 2013

(65) Prior Publication Data

US 2013/0195357 A1 Aug. 1, 2013

Related U.S. Application Data

(63) Continuation of application No. 12/902,070, filed on Oct. 11, 2010, now Pat. No. 8,433,134, which is a continuation of application No. PCT/JP2010/056560, filed on Apr. 13, 2010.

(30) Foreign Application Priority Data

Apr. 14, 2009 (JP) .................................. 2009-098142
Mar. 17, 2010 (JP) .................................. 2010-061060

(51) Int. Cl.
*G06K 9/00* (2006.01)
*H04N 5/228* (2006.01)

(52) U.S. Cl.
USPC ....................................... 382/167; 348/222.1

(58) Field of Classification Search
None
See application file for complete search history.

(56) References Cited

U.S. PATENT DOCUMENTS

| 4,641,959 | A | * | 2/1987 | Terashita ........................ 355/77 |
| 5,717,783 | A | * | 2/1998 | Endo et al. .................... 382/167 |
| 5,805,213 | A | * | 9/1998 | Spaulding et al. .......... 348/222.1 |
| 6,072,464 | A | * | 6/2000 | Ozeki ........................... 345/603 |
| 6,628,829 | B1 | * | 9/2003 | Chasen ......................... 382/167 |
| 6,654,055 | B1 | * | 11/2003 | Park et al. .................... 348/242 |
| 7,551,797 | B2 | * | 6/2009 | Dorrell et al. ................ 382/274 |
| 7,636,473 | B2 | * | 12/2009 | Imai et al. .................... 382/167 |
| 8,433,134 | B2 | * | 4/2013 | Ishii ............................. 382/167 |
| 2004/0046939 | A1 | * | 3/2004 | Nakamura et al. ............... 353/7 |
| 2004/0070565 | A1 | * | 4/2004 | Nayar et al. .................. 345/156 |
| 2005/0213128 | A1 | * | 9/2005 | Imai et al. .................... 358/1.9 |
| 2005/0270383 | A1 | * | 12/2005 | Hung ........................ 348/225.1 |
| 2006/0008171 | A1 | * | 1/2006 | Petschnigg et al. ........... 382/254 |
| 2006/0018539 | A1 | * | 1/2006 | Sato et al. .................... 382/173 |

(Continued)

FOREIGN PATENT DOCUMENTS

EP 1986418 A2 * 10/2008 ............... H04N 1/60
WO WO 2008050761 A1 * 5/2008

*Primary Examiner* — Wenpeng Chen
(74) *Attorney, Agent, or Firm* — Canon U.S.A., Inc., IP Division

(57) ABSTRACT

A position of a pixel serving as an extraction subject is determined by using first image data photographed under a first light source. An extraction range corresponding to the determined position is also determined, by using a color value of the pixel at the determined position and a color value of a pixel at a peripheral position around the determined position in the first image data. A first representative color value is calculated from the first image data and a second representative color value from second image data photographed under a second light source, on the basis of the position of the pixel serving as the extraction subject and the extraction range. A color correction condition for converting a color value depending on the first light source into a color value depending on the second light source is then generated.

4 Claims, 17 Drawing Sheets

(56) References Cited

U.S. PATENT DOCUMENTS

| | | | |
|---|---|---|---|
| 2006/0050335 A1* | 3/2006 | Dorrell et al. | 358/516 |
| 2006/0103728 A1* | 5/2006 | Ishigami et al. | 348/180 |
| 2006/0158529 A1* | 7/2006 | Katagiri | 348/222.1 |
| 2006/0204084 A1* | 9/2006 | Matsuura | 382/162 |
| 2006/0280360 A1* | 12/2006 | Holub | 382/162 |
| 2007/0091111 A1* | 4/2007 | Gutta | 345/591 |
| 2007/0177797 A1* | 8/2007 | Smith et al. | 382/164 |
| 2008/0089580 A1* | 4/2008 | Marcu | 382/162 |
| 2008/0260246 A1* | 10/2008 | Suzuki et al. | 382/167 |
| 2009/0175536 A1* | 7/2009 | Gutta et al. | 382/166 |
| 2010/0165137 A1* | 7/2010 | Koishi | 348/222.1 |

* cited by examiner

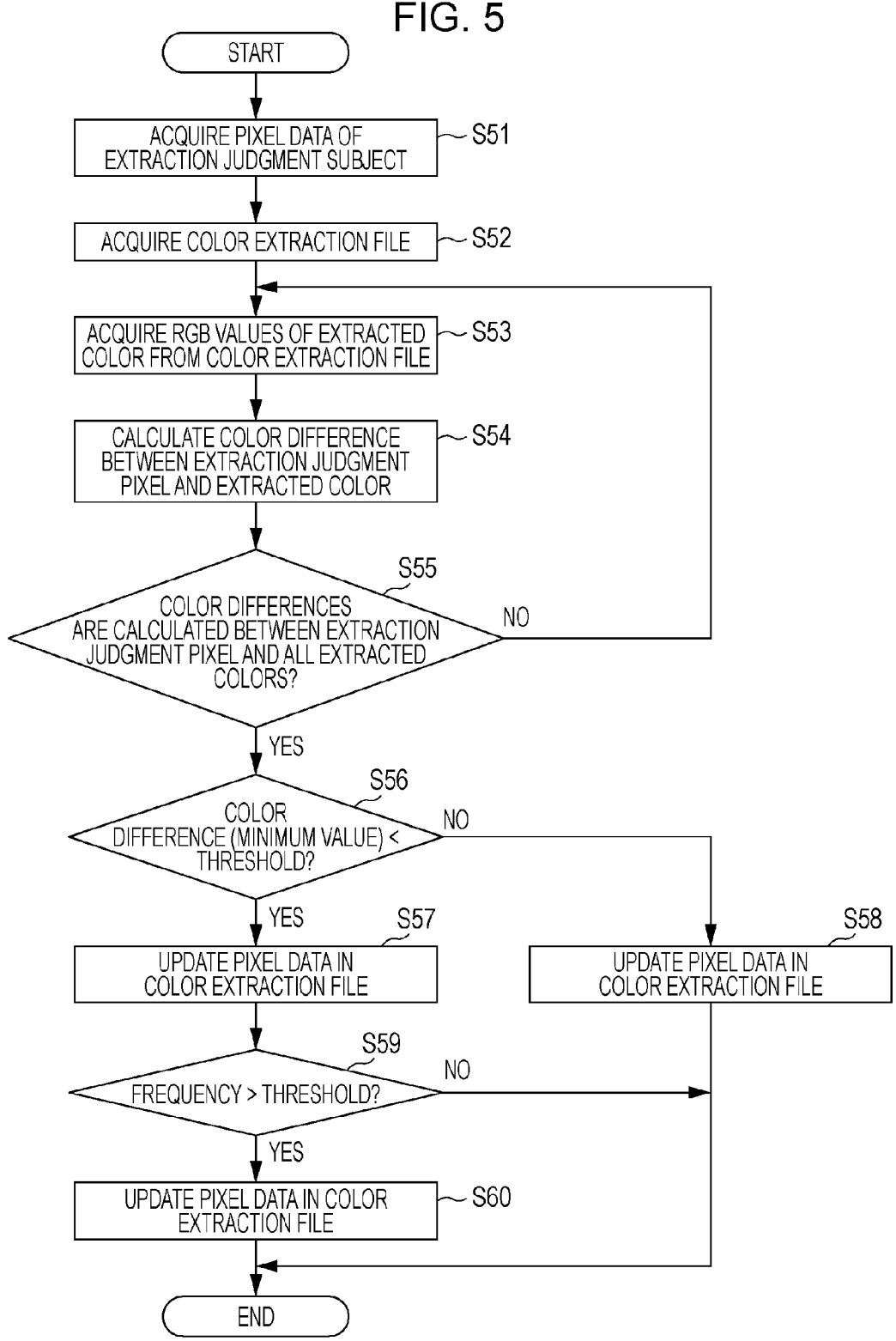

FIG. 6A

ACQUIRED DATA FROM PHOTOGRAPHED IMAGE

| R | G | B | x | y |
|---|---|---|---|---|
| 82 | 62 | 42 | 420 | 350 |

COLOR EXTRACTION FILE
3 (NUMBER OF EXTRACTED SAMPLES)

| NO. | R | G | B | x | y | FREQUENCY |
|---|---|---|---|---|---|---|
| 1 | 100 | 92 | 46 | 0 | 0 | 200 |
| 2 | 82 | 62 | 40 | 85 | 0 | 150 |
| 3 | 25 | 45 | 38 | 555 | 275 | 2000 |

UPDATE ⇒

COLOR EXTRACTION FILE
3 (NUMBER OF EXTRACTED SAMPLES)

| NO. | R | G | B | x | y | FREQUENCY |
|---|---|---|---|---|---|---|
| 1 | 100 | 92 | 46 | 0 | 0 | 200 |
| 2 | 82 | 62 | 42 | 420 | 350 | 151 |
| 3 | 25 | 45 | 38 | 555 | 275 | 2000 |

* IF ACQUIRED DATA FROM PHOTOGRAPHED IMAGE BELONGS TO PREDETERMINED REGION IN COLOR SPACE AS COMPARED WITH COLOR DATA SAVED IN COLOR EXTRACTION FILE, 1 IS ADDED TO FREQUENCY AND COLOR EXTRACTION FILE IS UPDATED.

FIG. 6B

ACQUIRED DATA FROM PHOTOGRAPHED IMAGE

| R | G | B | x | y |
|---|---|---|---|---|
| 40 | 44 | 43 | 1635 | 2778 |

COLOR EXTRACTION FILE
3 (NUMBER OF EXTRACTED SAMPLES)

| NO. | R | G | B | x | y | FREQUENCY |
|---|---|---|---|---|---|---|
| 1 | 100 | 92 | 46 | 0 | 0 | 200 |
| 2 | 82 | 62 | 40 | 85 | 0 | 150 |
| 3 | 25 | 45 | 38 | 555 | 275 | 2000 |

UPDATE ⇒

COLOR EXTRACTION FILE
4 (NUMBER OF EXTRACTED SAMPLES)

| NO. | R | G | B | x | y | FREQUENCY |
|---|---|---|---|---|---|---|
| 1 | 100 | 92 | 46 | 0 | 0 | 200 |
| 2 | 82 | 62 | 40 | 85 | 0 | 150 |
| 3 | 25 | 45 | 38 | 555 | 275 | 2000 |
| 4 | 40 | 44 | 43 | 1635 | 2778 | 1 |

* IF ACQUIRED DATA FROM PHOTOGRAPHED IMAGE DOES NOT BELONG TO PREDETERMINED REGION IN COLOR SPACE AS COMPARED WITH COLOR DATA SAVED IN COLOR EXTRACTION FILE, ACQUIRED DATA IS NEWLY ADDED TO COLOR EXTRACTION FILE.

FIG. 6C

ACQUIRED DATA FROM PHOTOGRAPHED IMAGE

| R | G | B | x | y |
|---|---|---|---|---|
| 25 | 45 | 38 | 2800 | 1528 |

COLOR EXTRACTION FILE
3 (NUMBER OF EXTRACTED SAMPLES)

| NO. | R | G | B | x | y | FREQUENCY |
|---|---|---|---|---|---|---|
| 1 | 100 | 92 | 46 | 0 | 0 | 200 |
| 2 | 82 | 62 | 40 | 85 | 0 | 150 |
| 3 | 25 | 45 | 38 | 555 | 275 | 2000 |

UPDATE ⇒

COLOR EXTRACTION FILE
4 (NUMBER OF EXTRACTED SAMPLES)

| NO. | R | G | B | x | y | FREQUENCY |
|---|---|---|---|---|---|---|
| 1 | 100 | 92 | 46 | 0 | 0 | 200 |
| 2 | 82 | 62 | 40 | 85 | 0 | 150 |
| 3 | 25 | 45 | 38 | 555 | 275 | 2000 |
| 4 | 25 | 45 | 38 | 2800 | 1528 | 1 |

* IF COLOR DATA IS IN THE SAME REGION IN COLOR SPACE AND IF COLOR DATA EXCEEDS THRESHOLD (ASSUMED AS 2000 HEREIN), ACQUIRED DATA IS NEWLY ADDED TO COLOR EXTRACTION FILE.

FIG. 8

| 100 (NUMBER OF EXTRACTED SAMPLES) ||||||
|---|---|---|---|---|---|
| NO. | R | G | B | x | y | EXTRACTION RANGE |
| 1 | 100 | 92 | 46 | 0 | 0 | 10 |
| 2 | 82 | 62 | 40 | 85 | 0 | 6 |
| 3 | 25 | 45 | 38 | 555 | 275 | 6 |
| ...... ||||||
| 100 | 40 | 44 | 43 | 1635 | 2778 | 8 |

IMAGE PROCESSING DEVICE AND IMAGE PROCESSING METHOD TO CALCULATE A COLOR CORRECTION CONDITION

CROSS-REFERENCE TO RELATED APPLICATIONS

This application is a Continuation of U.S. patent application Ser. No. 12/902,070, filed Oct. 11, 2010, which is a Continuation of International Application No. PCT/JP2010/056560, filed Apr. 13, 2010, which claims the benefit of Japanese Patent Application No. 2009-098142, filed Apr. 14, 2009 and No. 2010-061060, filed Mar. 17, 2010, all of which are hereby incorporated by reference herein in their entireties.

TECHNICAL FIELD

The present invention relates to a configuration that calculates a color correction condition in accordance with a photographed image.

BACKGROUND ART

To convert a color of an image that is photographed under a light source different from an observation light source into a color equivalent to a color of an image that is photographed under the observation light source, color correction processing is required, in which color data under a photography light source is converted into color data under the observation light source.

Patent Literature 1 describes a method for calculating a color correction condition for color space conversion although the method does not correct the difference between the light sources. Patent Literature 1 provides a color conversion matrix by a least-square method. The color conversion matrix causes RGB signal values obtained by photographing a color chart to match with target RGB signal values obtained from colorimetric values of the color chart.

CITATION LIST

Patent Literature

PTL 1 Japanese Patent Laid-Open No. 2005-79834

Calculating a color correction condition for an object with a metallic glossy portion has a difficulty as follows. The color of the metallic glossy portion significantly changes depending on a photography condition. Thus, if the color correction condition for light source conversion is calculated by using photography data of the metallic glossy portion, precision of color correction may be decreased.

As described above, the image includes image data that is not appropriate for a representative color used for generating the color correction condition. The image also involves matters that have to be considered, such as noise and texture.

The present invention is made in view of the situations, and an object of the present invention is to highly precisely generate a color correction condition for light source conversion appropriate for an image.

SUMMARY OF INVENTION

To attain the object, an image processing device according to the present invention includes an acquiring unit configured to acquire first image data of a first photographed image photographed under a first light source and second image data of a second photographed image photographed under a second light source; an extraction-position determining unit configured to determine a position of a pixel serving as an extraction subject by using the first image data; an extraction-range determining unit configured to determine an extraction range corresponding to the determined position, by using a color value of the pixel at the determined position and a color value of a pixel at a peripheral position around the determined position in the first image data; a calculating unit configured to calculate a first representative color value from the first image data and a second representative color value from the second image data, on the basis of the position of the pixel serving as the extraction subject and the extraction range; a generating unit configured to generate a color correction condition for converting a color value depending on the first light source into a color value depending on the second light source, by using the first representative color value and the second representative color value; and a color correction unit configured to perform color correction for the first image data by using the color correction condition.

Further features of the present invention will become apparent from the following description of exemplary embodiments with reference to the attached drawings.

BRIEF DESCRIPTION OF DRAWINGS

FIG. 5 is a flowchart of processing by an extraction-position determining unit 105.

FIGS. 6A to 6C are illustrations each explaining update of a color extraction file during extraction-position determination processing.

FIG. 8 is an illustration explaining the color extraction file.

DESCRIPTION OF EMBODIMENTS

First Embodiment

Figure 15:
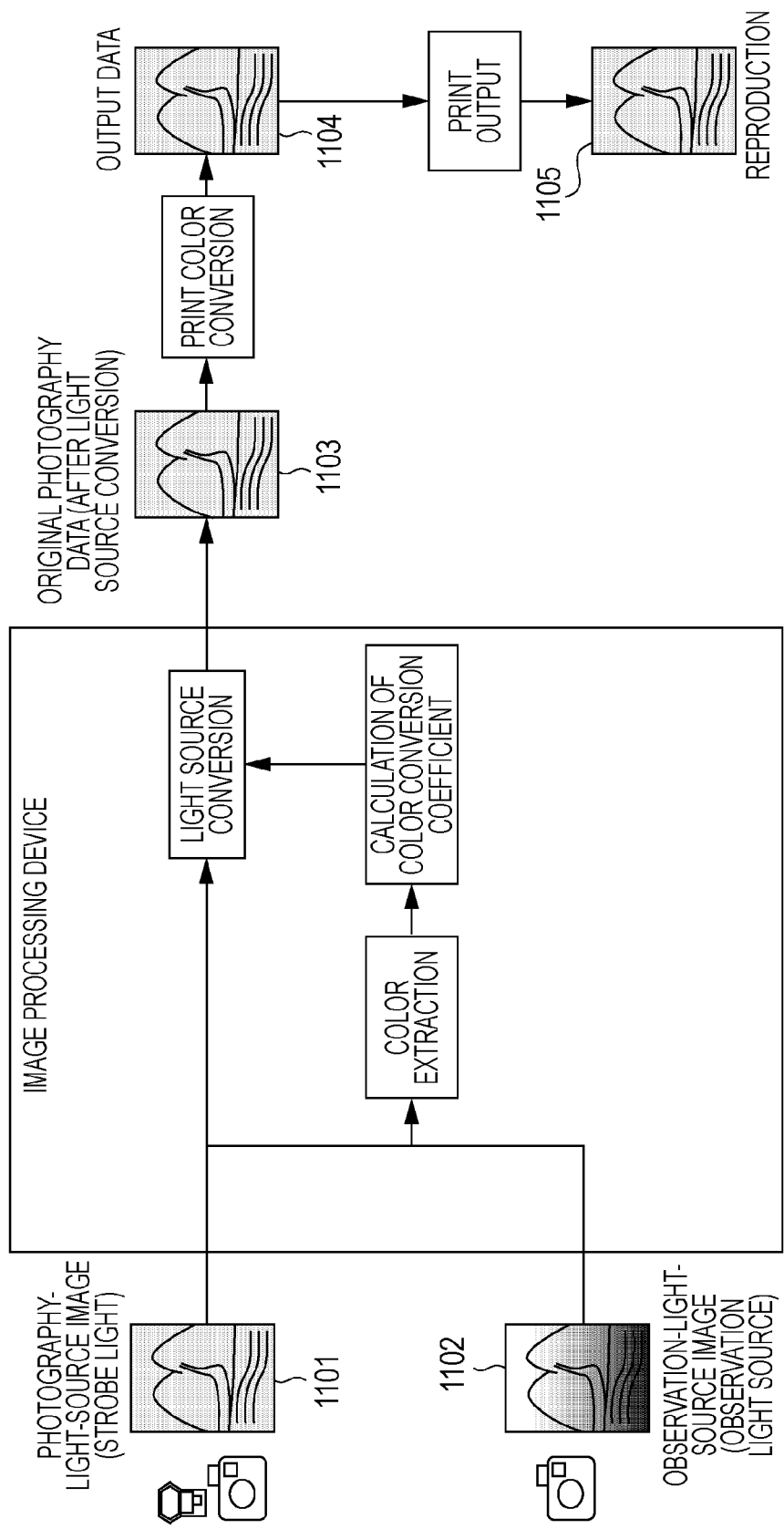
FIG. 15 is an illustration explaining entire image processing.

An example of reproducing an original will be described first. Referring to FIG. 15, an image processing device converts a photography-light-source image 1101, which is obtained by photographing an original by using strobe light, into an image 1103 for an observation light source, with which a reproduction of the original is actually observed, by light-source conversion processing. The image 1103 is converted into output data 1104, which is print data according to the observation light source, by print-color conversion processing. Then, a printer generates a reproduction 1105 based on the output data 1104.

Figure 16:
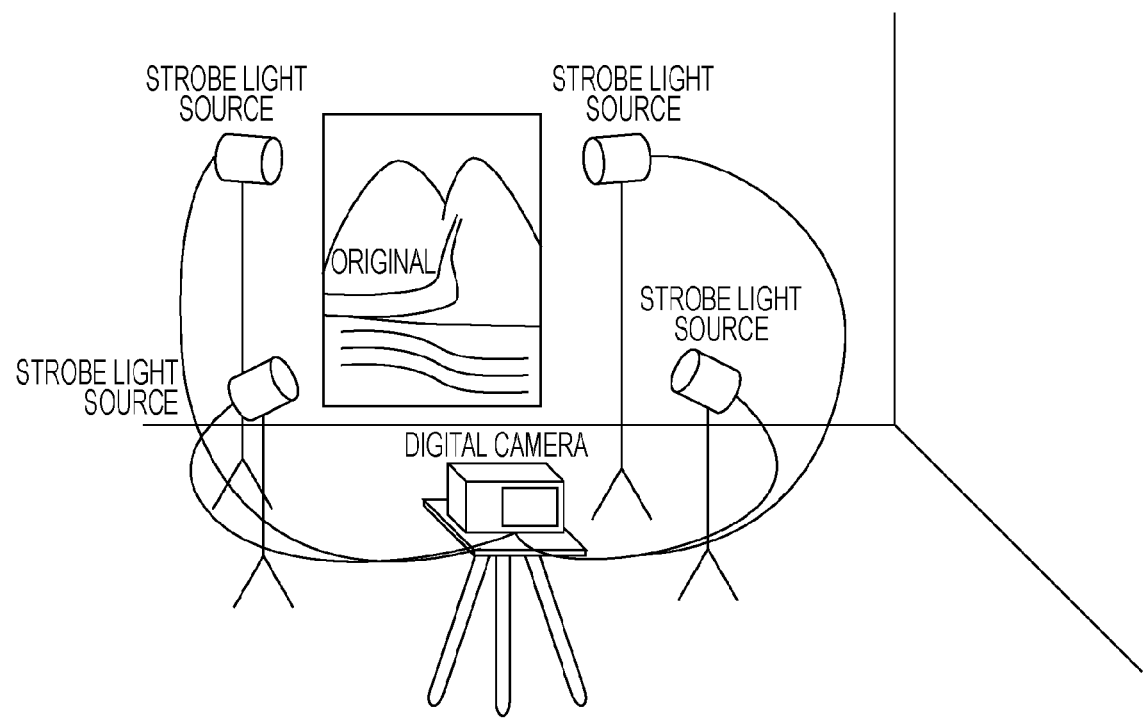
FIG. 16 is an illustration of a photographing method for an image with a photography light source.

Referring to FIG. 16, the photography-light-source image 1101 is an image with high definition obtained by photographing an original with a digital camera under a sufficient quantity of strobe light from a plurality of strobe lamps arranged around the original.

Figure 17:
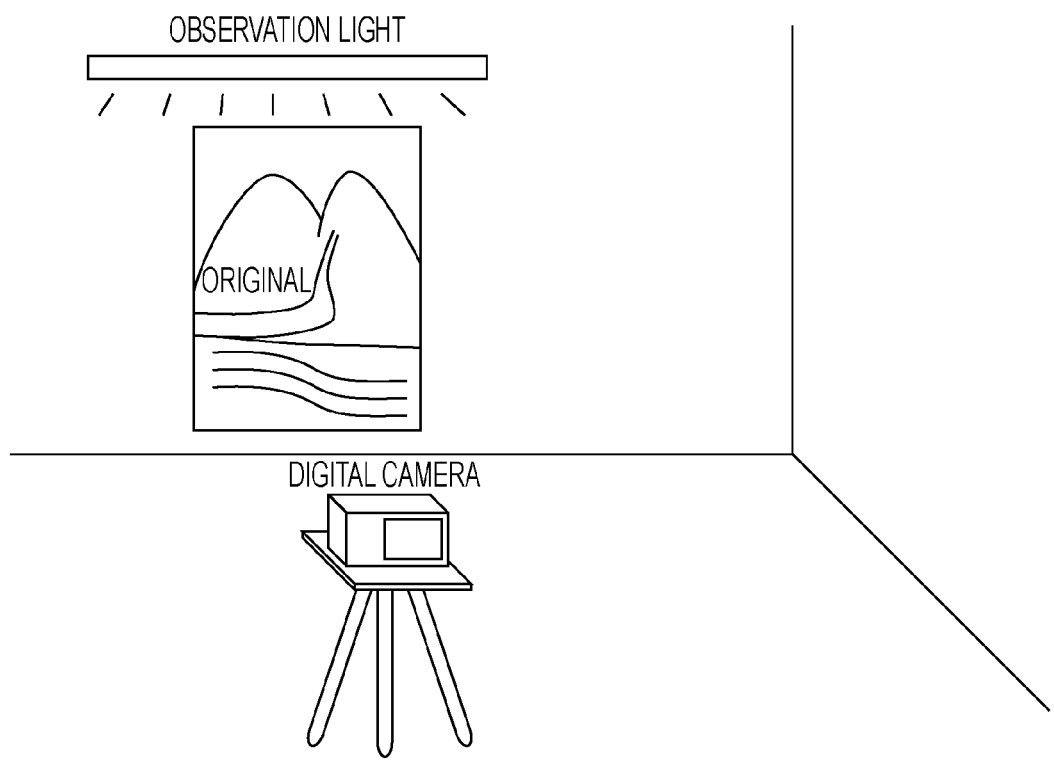
FIG. 17 is an illustration of a method for photographing an observation-light-source image.

Referring to FIG. 17, an observation-light-source image 1102 is an image obtained by photographing the original with a digital camera under a light source for observing the original while the positional relationship between the original and the digital camera during photographing the observation-light-source image corresponds to that during photographing the photography-light-source image.

The reproduction is required to be a noiseless high-precision image having the same colors as the colors of the original placed under the observation light source. Thus, the light-source conversion processing is required. In this embodiment, a color correction condition is generated as follows in order to highly precisely perform the light-source conversion processing.

Figure 1:
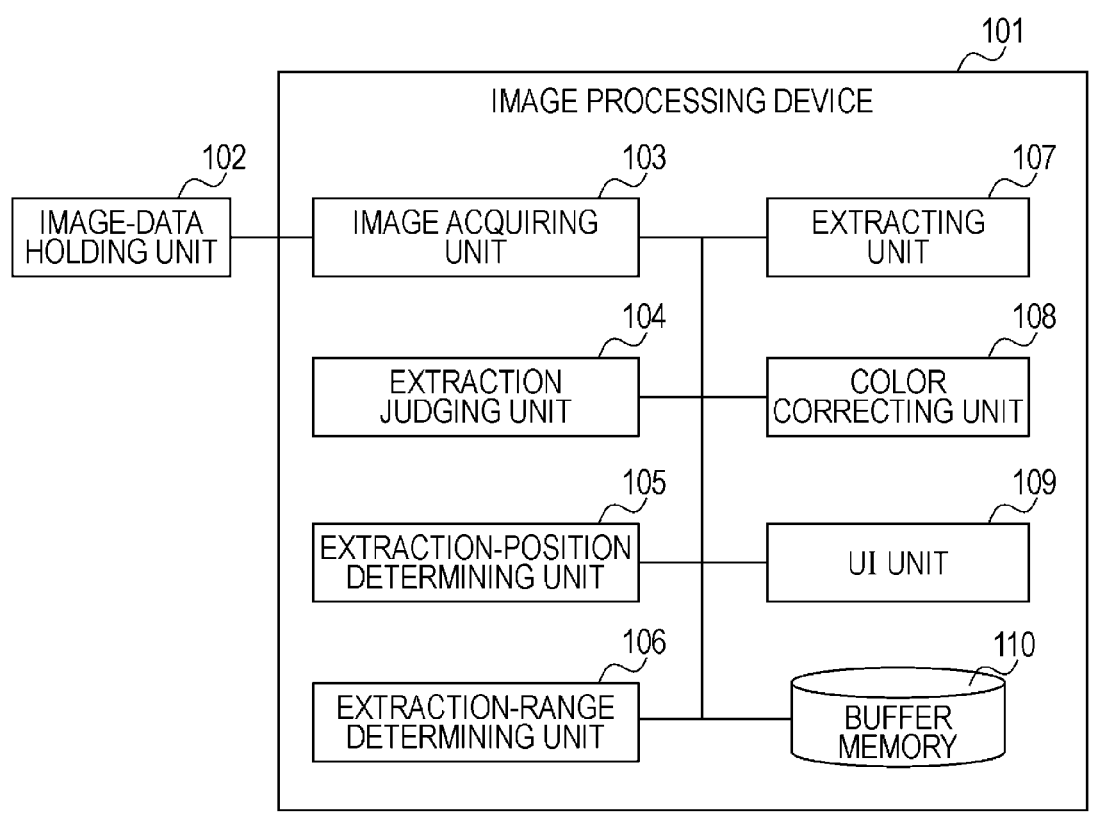
FIG. 1 is a block diagram showing a configuration of an image processing device according to a first embodiment.

First, the photography-light-source image 1101 and the observation-light-source image 1102 are acquired. Then, representative colors are extracted from the acquired images through processing by an extraction judging unit, an extraction-position determining unit, and an extraction-range determining unit. A color correction coefficient for the light-source conversion processing is calculated on the basis of the correspondence between the extracted colors. The embodiment will be described in detail below. FIG. 1 is a block diagram showing a configuration of a system according to the first embodiment. FIG. 1 illustrates an image processing device 101. An image-data holding unit 102 holds image data of a photographed image. A photographed-image acquiring unit 103 acquires the image data of the photographed image from the image-data holding unit 102. An extraction judging unit 104 judges whether color data is extracted from the photographed image. An extraction-position determining unit 105 determines an image position in the photographed image for extracting the color data. An extraction-range determining unit 106 determines an extraction range when the color data is extracted from the photographed image. An extracting unit 107 extracts the color data from the image data of the photographed image.

A color correcting unit 108 performs color correction for the image data. A UI unit 109 provides a display of a user interface for a user. A buffer 110 is a buffer memory that temporarily saves the image data and a calculation result during calculation processing.

<Operation of Image Processing Device 101>

Figure 2:
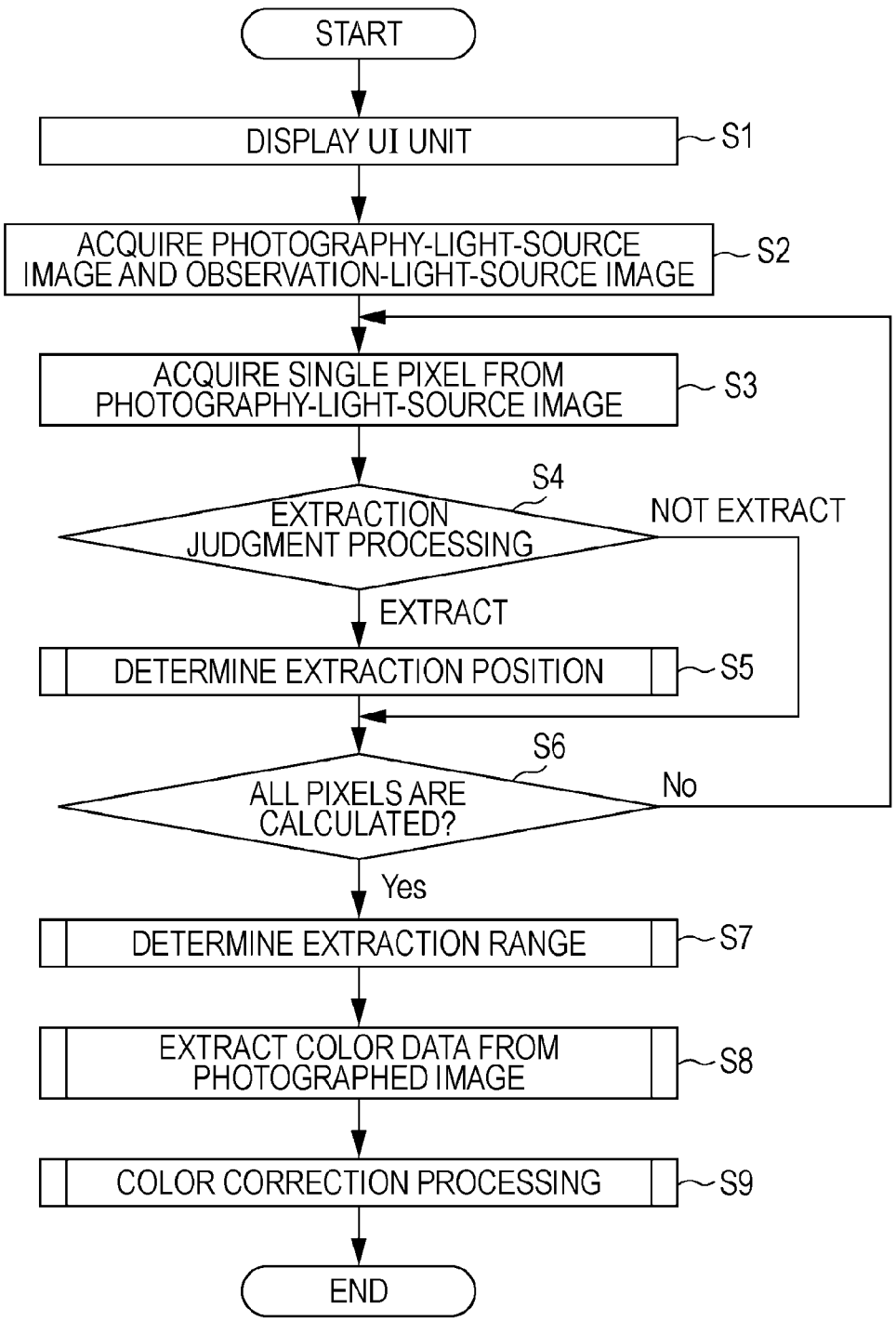
FIG. 2 is a flowchart of processing by an image processing device 101.

FIG. 2 is a flowchart of processing that is executed by the image processing device 101.

Figure 3:
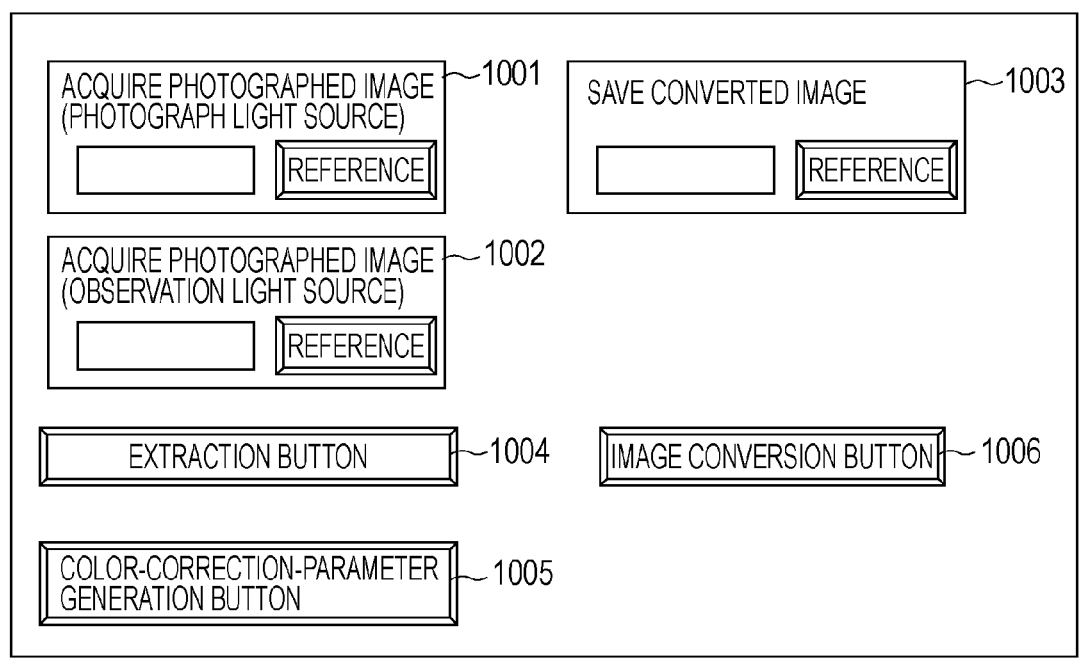
FIG. 3 is an illustration of a user interface that is displayed by a UI unit 109.

In step S1, the UI unit 109 displays a user interface to allow a user to input information necessary for image processing. FIG. 3 illustrates an example of the user interface. An instruction input unit 1001 gives an instruction to indicate a photography-light-source image photographed under a photography light source. An instruction input unit 1002 gives an instruction to indicate an observation-light-source image photographed under an observation light source. An instruction input unit 1003 gives an instruction to indicate a file name when an image after image conversion is saved.

An extraction button 1004 gives an instruction for processing to extract a color from the photographed image. A color-correction-parameter generation button 1005 gives an instruction to generate a color correction parameter by using the extracted color data. An image conversion button 1006 gives an instruction to perform color correction for the photographed image by using the color correction parameter.

In step S2, the photographed-image acquiring unit 103 acquires the photography-light-source image photographed under the photography light source and the observation-light-source image photographed under the observation light source, from the image-data holding unit 102, based on image file names indicated by the instruction units 1001 and 1002. The buffer 110 saves the photography-light-source image and the observation-light-source image. The photography-light-source image and the observation-light-source image are images photographed with the same positional relationship between an object and a camera under the different light sources.

In step S3, RGB values and a position coordinate (x, y) for a single pixel are acquired from the photography-light-source image saved in the buffer 110. In step S4, the extraction judging unit 104 judges whether the pixel acquired in step S3 is a subject pixel from which color data should be extracted. If the pixel is the extraction subject pixel, the process goes to step S5. If the pixel is not the extraction subject pixel, the process goes to step S6. In step S5, the extraction-position determining unit 105 analyzes color data of the extraction subject pixel, and determines the extraction position. In step S6, the photographed-image acquiring unit 103 judges whether the processing in step S4 and S5 is performed for all pixels in the photography-light-source image. If the processing is performed for all pixels, the process goes to step S7. If the processing is performed not for all pixels, the process goes to step S3.

In step S7, the extraction-range determining unit 106 determines an extraction range based on color data around the position determined by the extraction-position determining unit 105. In step S8, the extracting unit 107 extracts color data respectively from the photography-light-source image and the observation-light-source image based on the extraction position determined in step S5 and the extraction range determined in step S7.

In step S9, the color correcting unit 108 generates a color correction parameter (a color correction condition) that converts a color depending on the photography light source into a color depending on the observation light source by using the color data acquired from the photography-light-source image and the observation-light-source image in step S8. The generated parameter is used to perform the color correction for the photography-light-source image.

<Operation of Extraction Judging Unit 104 (Step S4)>

Figure 4:
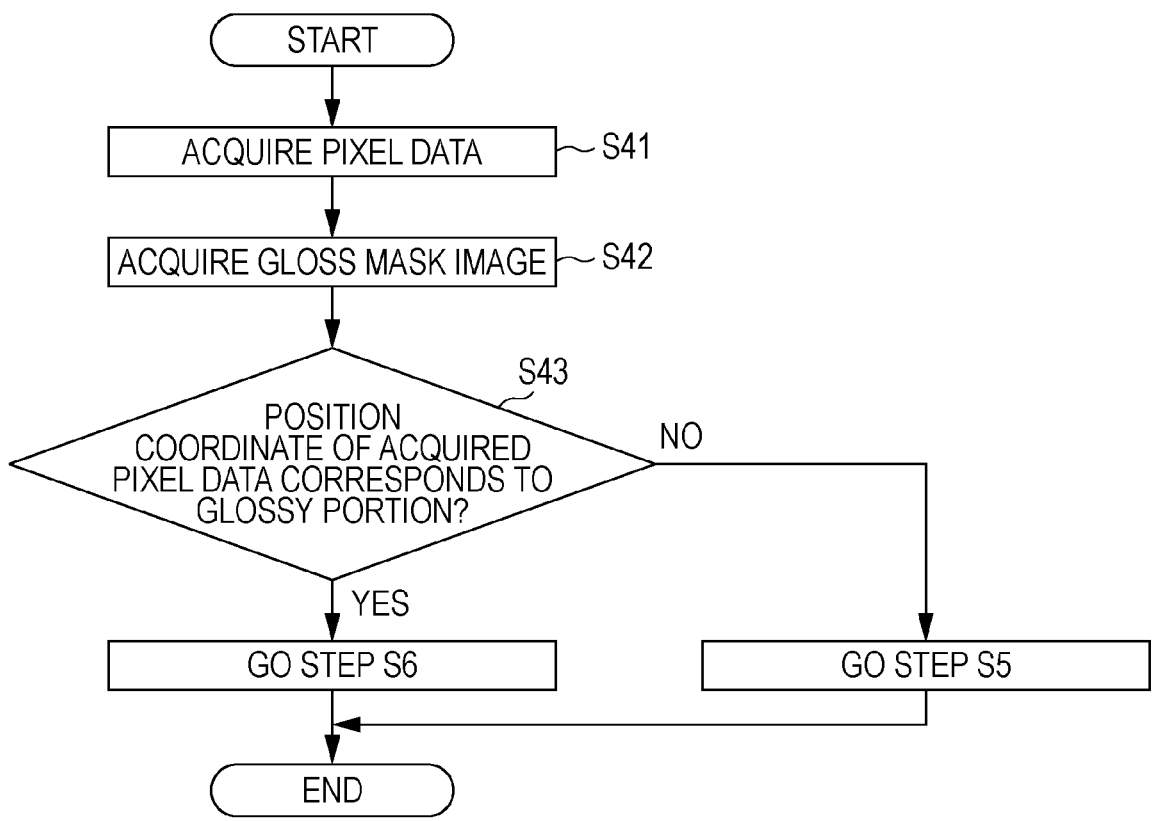
FIG. 4 is a flowchart of processing by an extraction judging unit 104.

FIG. 4 is a flowchart of processing executed by the extraction judging unit 104 in step S4.

In step S41, the RGB values and the position coordinate (x, y) of the pixel acquired in step S3 are acquired. In step S42, a gloss mask image, which is held in the buffer 110 in advance, is acquired. The gloss mask image is generated as follows. An object having a metallic glossy portion is photographed from the front with strobe light, and from a position at 45 degrees to the front with strobe light. Then, portions with a large difference in brightness between the corresponding pixels in the two photographed images obtained through the photographing are extracted, and the gloss mask image is generated by using that portions.

In step S43, it is judged whether the position coordinate (x, y) of the acquired pixel corresponds to the glossy portion, with reference to the gloss mask image. If the acquired pixel is the glossy portion, the process goes to step S6. If the acquired pixel is not the glossy portion, the process goes to step S5.

<Operation of Extraction-Position Determining Unit 105 (Step S5)>

FIG. 5 is a flowchart of processing executed by the extraction-position determining unit 105 in step S5.

In step S51, the RGB values and the position coordinate (x, y) of the pixel (the extraction-judgment subject pixel), which is not the glossy portion when determined in step S4, are acquired.

In step S52, a color extraction file is acquired from the buffer 110. The color extraction file is a file in which the number of extracted samples, the RGB values and the position coordinate (x, y) of each extracted pixel, and a frequency (a cumulative count of colors judged as in the same region as a result of a color difference calculation, which will be described later) are written and saved. The color extraction file is updated every time when a pixel is acquired.

In step S53, RGB values of a single extracted color are acquired from the color extraction file. If no pixel data is in the color extraction file, pixel data, which has been acquired first, is written in the color extraction file.

In step S54, the RGB values of the extraction-judgment subject pixel acquired in step S51 and the RGB values of the extracted color acquired from the color extraction file in step S53 are converted into Lab values by using a predetermined conversion expression, and a color difference (ΔE) between the two sets of RGB values is calculated by using the following expression. The predetermined conversion expression is a combination of a conversion expression for converting Adobe RGB into XYZ and a CIE-Lab conversion expression. Of course, other conversion expressions, such as a sRGB conversion expression may be used.

$$\Delta E = \sqrt{(L_0 - L_1)^2 + (a_0 - a_1)^2 + (b_0 - b_1)^2}$$ [Expression 1]

$L_0, a_0, b_0$: Lab values of extraction subject pixel acquired from photography-light-source image $L_1, a_1, b_1$: Lab values of extracted color acquired from color extraction file In step S55, it is determined whether color differences are calculated for all extracted colors stored in the color extraction file. If color differences are calculated for all extracted colors, the process goes to step S56. If the color differences are calculated not for all extracted colors, the process goes to step S53.

In step S56, the extraction-position determining unit 105 detects a minimum value from among the plurality of color differences calculated in step S54, and compares the minimum value with a predetermined threshold.

If the minimum value is smaller than the threshold value, the process goes to step S57. If the minimum value is equal to or larger than the threshold, the process goes to step S58. The threshold for judging the color difference is "5" in this embodiment; however, another value may be used.

In step S57, 1 is added to the frequency corresponding to the extracted color whose color difference is determined minimum in step S56. Then, the pixel value and the position coordinate are updated.

The pixel value and the position coordinate are updated as follows. In this embodiment, a standard deviation within a predetermined extraction range is calculated by using the following expression, and a pixel value with a minimum standard deviation is determined as a representative value within the frequency. In this application, the predetermined extraction range corresponds to an extraction size of 5 pixels; however, another value may be used. FIG. 6A illustrates the update of the color extraction file in step S57.

$$\begin{cases} \sigma_R = \sqrt{\dfrac{\sum_{i=1}^{n}(R_i - \overline{R})^2}{n-1}} \\ \sigma_G = \sqrt{\dfrac{\sum_{i=1}^{n}(G_i - \overline{G})^2}{n-1}} \\ \sigma_B = \sqrt{\dfrac{\sum_{i=1}^{n}(B_i - \overline{B})^2}{n-1}} \end{cases}$$ [Expression 2]

$R_i$: R value within extraction range of photography-light-source image
    $iamgeR(x + s, y + t)$  $s = -\text{size to} + \text{size}$, $t = -\text{size to} + \text{size}$
$G_i$: G value within extraction range of photography-light-source image
    $iamgeG(x + s, y + t)$  $s = -\text{size to} + \text{size}$, $t = -\text{size to} + \text{size}$
$B_i$: B value within extraction range of photography-light-source image
    $iamgeB(x + s, y + t)$  $s = -\text{size to} + \text{size}$, $t = -\text{size to} + \text{size}$
$imageR(x, y)$: pixel value (R) of image at coordinate (x, y)
$imageG(x, y)$: pixel value (G) of image at coordinate (x, y)
$imageB(x, y)$: pixel value (B) of image at coordinate (x, y)
size: extraction size (pixel)
$\overline{R}$: average value of $R_i$
$\overline{G}$: average value of $G_i$
$\overline{B}$: average value of $B_i$
$n$: number of samples within extraction range In step S58, data whose color difference is equal to or larger than the threshold in step S56 is added to the color extraction file. FIG. 6B illustrates the update of the color extraction file in step S58.

In step S59, it is judged whether the frequency updated in step S57 is larger than a predetermined threshold. If the frequency is larger than the threshold, the process goes to step S60. If the frequency is equal to or smaller than the threshold, the processing is ended. In this application, 1% of the total number of pixels in the photography-light-source image is used as the threshold for the frequency; however, another value may be used.

In step S60, data whose frequency is larger than the threshold in step S59 is added to the color extraction file. FIG. 6C illustrates the update of the color extraction file in step S60.

<Operation of Extraction-Range Determining Unit 106 (Step S7)>

Figure 7:
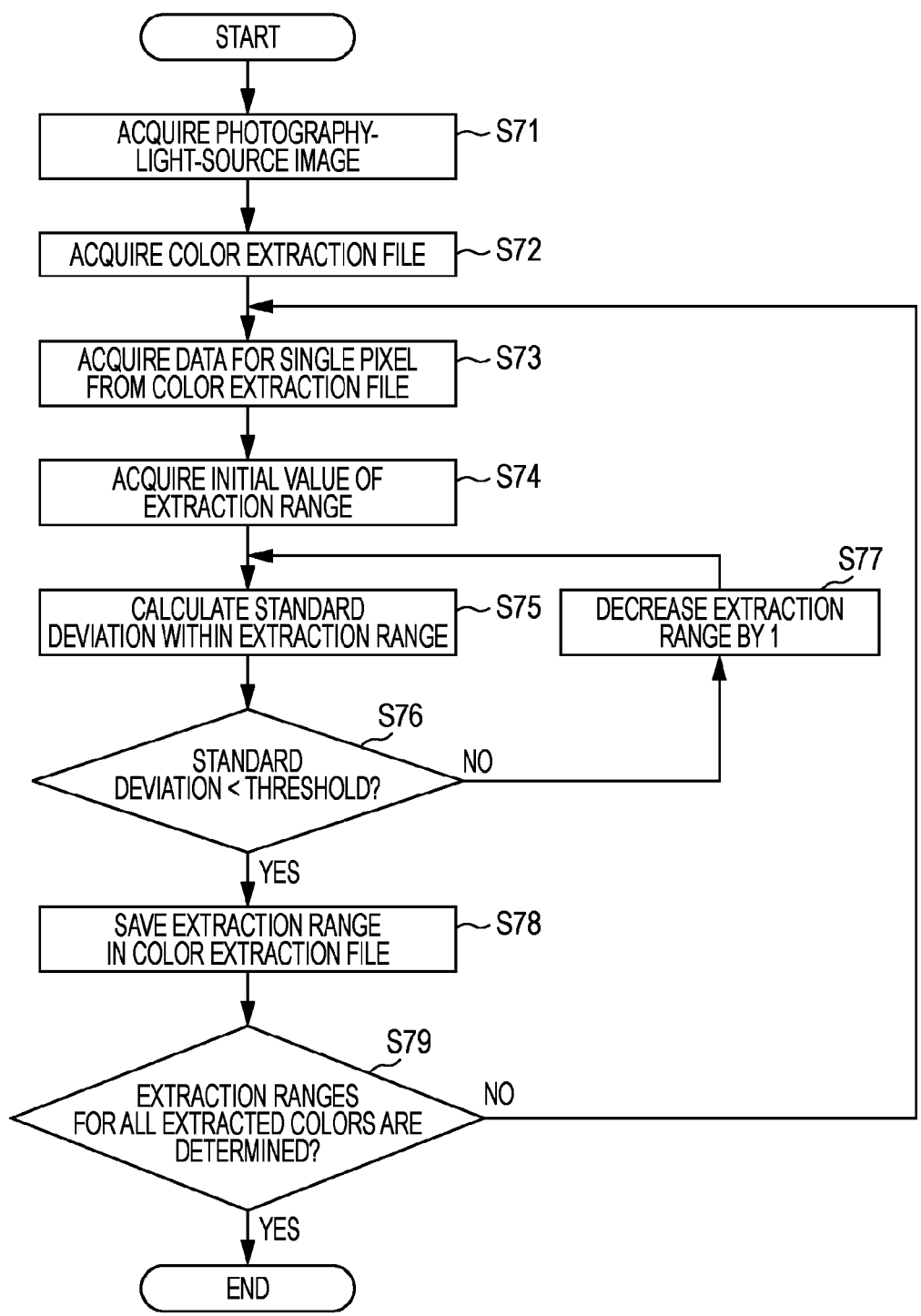
FIG. 7 is a flowchart of processing by an extraction-range determining unit 106.

FIG. 7 is a flowchart of processing executed by the extraction-range determining unit 106 in step S7.

In step S71, the photography-light-source image is acquired from the buffer 110.

In step S72, the color extraction file generated in step S5 is acquired from the buffer 110.

In step S73, a position coordinate (x, y) of a single extracted color is acquired from the color extraction file. In step S74, an initial value of the extraction range, which is used when the pixel value is extracted from the photography-light-source image, is acquired. In this embodiment, the initial value of the extraction range is predetermined as a square range of 10 pixels long and 10 pixels wide.

In step S75, the pixel value within the extraction range determined in step S74 around the position coordinate acquired in step S73 is acquired from the photography-light-source image. Then, a standard deviation of the pixel value within the extraction range is calculated. The standard deviation is used for variation of colors within the extraction range in this embodiment; however, other statistical values, such as dispersion, may be used. In step S76, it is judged whether the standard deviation is larger than a predetermined threshold. If the standard deviation is equal to or larger than the threshold, the process goes to step S77. If the standard deviation is smaller than the threshold, the process goes to step S78.

In step S78, the extraction range that satisfies the threshold is saved in the color extraction file. FIG. 8 illustrates the color extraction file that is saved in step S78. Referring to FIG. 8, in the color extraction file, the number of extracted color samples, RGB values and a position coordinate (x, y) of each extracted color, and an extraction range (pixel) are written.

In step S77, the extraction range is decreased by 1 pixel. Then, the process goes to step S75 and the processing is repeated until the predetermined threshold is satisfied. In step S78, the extraction range whose standard deviation satisfies the predetermined value is saved in the color extraction file in correspondence with the extracted color at the position coordinate acquired in step S73. In step S79, it is judged whether extraction ranges are determined for all extracted colors in the color extraction file. If the extraction ranges are determined for all extracted colors, the process is ended. If the extraction ranges are determined not for all extracted colors, the process goes to step S73 to perform the processing for other extracted colors.

<Operation of Extracting Unit 107 (Step S8)>

Figure 9:
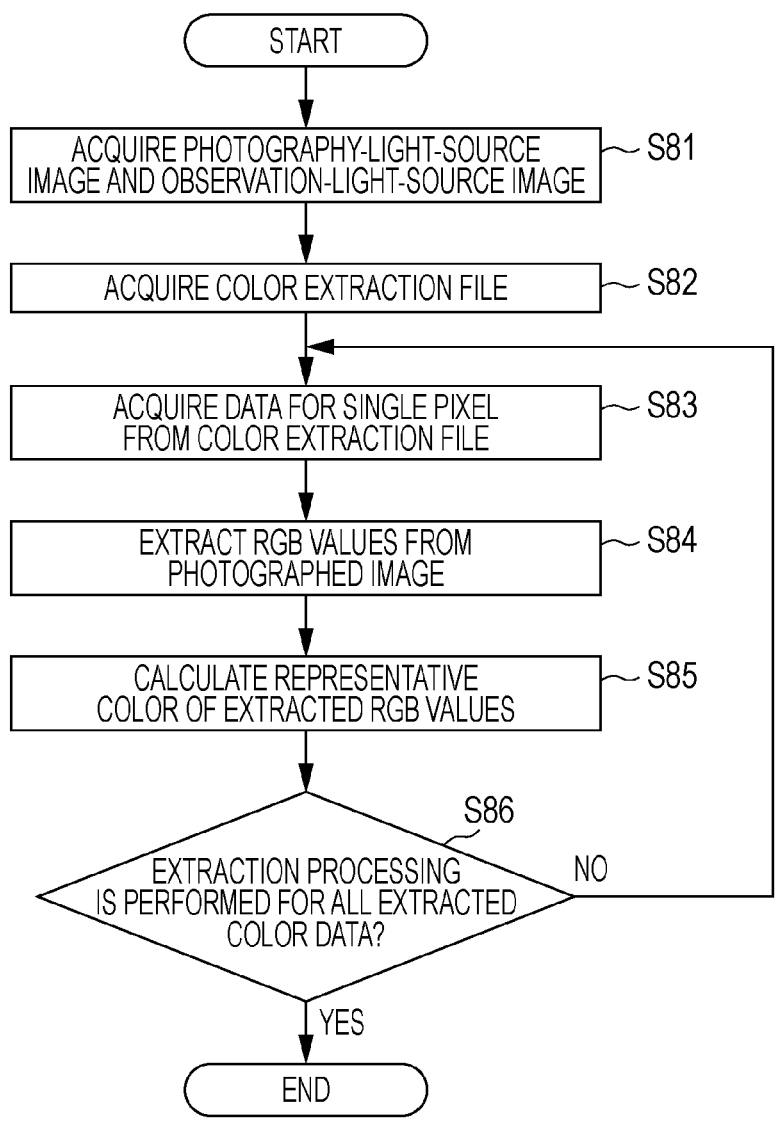
FIG. 9 is a flowchart of processing by an extracting unit 107.

FIG. 9 is a flowchart of processing executed by the extracting unit 107 in step S8.

In step S81, the photography-light-source image and the observation-light-source image are acquired from the buffer 110. In step S82, the color extraction file is acquired from the buffer 110. In step S83, RGB values and a position coordinate (x, y) of a single extracted color are acquired from the color extraction file. In step S84, RGB values within the extraction range are extracted from image data of the photography-light-source image and the observation-light-source image, based on the acquired position coordinate (x, y) and extraction range.

In step S85, an average value of the RGB values extracted from the photography-light-source image and a representative color of the RGB values extracted from the observation-light-source image are calculated by using the following expression, and the calculated result is saved in the buffer 110. The average value of the RGB values is used for the extraction in this embodiment; however, other statistical values, such as a central value, may be used.

Representative color $R$ value of photography-light-source image: [Expression 3]

$$\frac{\sum_{s=-size}^{size} \sum_{t=-size}^{size} imageR(x+s, y+t)}{n}$$

Representative color $G$ value of photography-light-source image:

$$\frac{\sum_{s=-size}^{size} \sum_{t=-size}^{size} imageG(x+s, y+t)}{n}$$

Representative color $B$ value of photography-light-source image:

$$\frac{\sum_{s=-size}^{size} \sum_{t=-size}^{size} imageB(x+s, y+t)}{n}$$

Representative color $R$ value of observation-light-source image:

$$\frac{\sum_{s=-size}^{size} \sum_{t=-size}^{size} imageR(x+s, y+t)}{n}$$

Representative color $G$ value of observation-light-source image:

-continued $$\frac{\sum_{s=-size}^{size}\sum_{t=-size}^{size} imageG(x+s, y+t)}{n}$$

Representative color B value of observation-light-source image:

$$\frac{\sum_{s=-size}^{size}\sum_{t=-size}^{size} imageB(x+s, y+t)}{n}$$

imageR(x, y): R value of image at coordinate (x, y)

imageG(x, y): G value of image at coordinate (x, y)

imageB(x, y): B value of image at coordinate (x, y)

size: extraction range (pixel)

s = −size to + size, t = −size to + size n: number of samples within extraction range In step S86, it is judged whether the extraction processing is performed for all extracted colors stored in the color extraction file. If the extraction processing is performed for all extracted colors, the processing is ended. If the extraction processing is performed not for all extracted colors, the process goes to step S83 to perform the processing for the next extracted color.

<Operation of Color Correcting Unit 108 (Step S9)>

Figure 10:
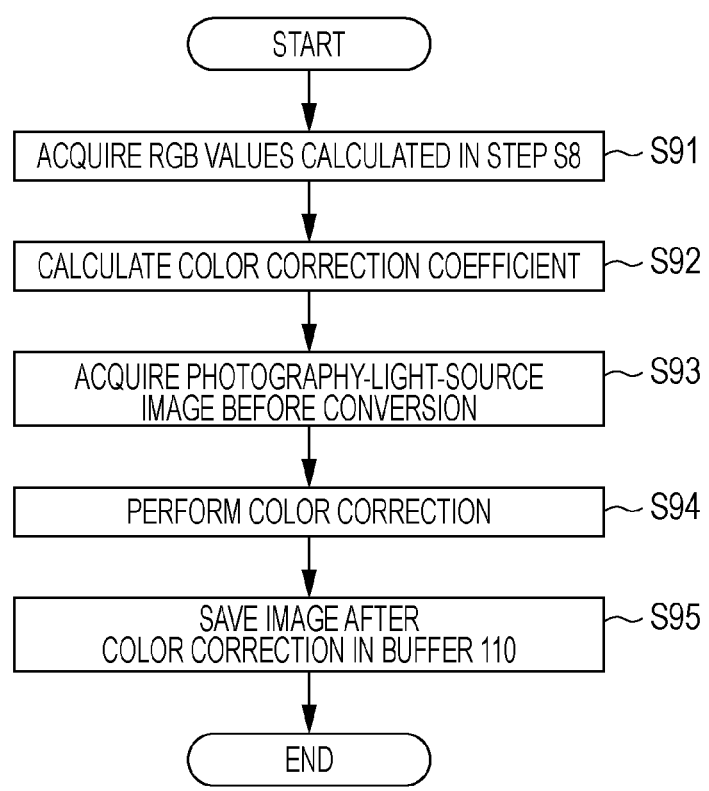
FIG. 10 is a flowchart of processing by a color correcting unit 108.

FIG. 10 is a flowchart of processing executed by the color correcting unit 108 in step S9.

In step S91, the representative color of the RGB values extracted from the photography-light-source image and the representative color of the RGB values extracted from the observation-light-source image are acquired from the buffer 110 for all extracted colors stored in the color extraction file.

In step S92, a color correction coefficient for converting RGB values depending on the photography light source into RGB values depending on the observation light source is calculated by using the representative color of the RGB values extracted from the photography-light-source image and the representative color of the RGB values extracted from the observation-light-source image. For the color correction coefficient, a matrix coefficient may be calculated as follows by, for example, a least-square method. This embodiment uses a 3×4 matrix as the matrix coefficient; however, a matrix of a different order may be used.

[Expression 4]

$$\begin{bmatrix} Ro \\ Go \\ Bo \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} Ri \\ Gi \\ Bi \\ 1 \end{bmatrix}$$

Ri, Gi, Bi: RGB values of photography-light-source image

Ro, Go, Bo: RGB values of observation-light-source image

In step S93, the photography-light-source image is acquired. In step S94, the color correcting unit 108 performs the color correction by using the color correction coefficient generated in step S92 for the photography-light-source image, and calculates a photographed image depending on the observation light source. In step S95, the image converted in step S94 (the photographed image depending on the observation light source) is saved in the buffer 110.

As described above, with this embodiment, the plurality of representative colors are extracted from the photographed image, and the color correction parameter for converting photographed image data depending on the photography light source into photographed image data depending on the observation light source can be calculated. That is, the color correction parameter appropriate for the photographed image can be generated.

Further, since the metallic glossy portion (the glossy region) is removed from the representative color by the extraction judgment processing in step S4, the precision of the color correction parameter can be prevented from being decreased. The color of the metallic glossy portion of the object significantly changes depending on a photography condition. Thus, the data including the metallic glossy portion is not appropriate for data that is used when the color correction coefficient is calculated. With this embodiment, since the gloss mask image is used to remove the metallic glossy portion from the extraction subject, the color correction coefficient with high precision can be generated.

In addition, since the color, whose color difference is larger than the predetermined value, is added as the extracted pixel in the extraction-position determination processing in step S5, the representative color can be determined over the entire color distribution of the photographed image. Accordingly, the color correction coefficient appropriate for the photographed image can be calculated.

Further, in the extraction-range determination processing in step S7, the extraction range is adjusted for each extraction pixel in accordance with the statistical value of the pixel data at the position to be extracted and the peripheral position around that position, in order to address a problem of noise included in the photographed image and a problem based on texture of the photographed image. If the texture includes too many colors, the extraction range may be narrowed. Thus, the color to be extracted is prevented from being inappropriate due to mixing of plural colors. If the texture includes too few colors, the extraction range may be widened. Thus, the color to be extracted is prevented from being inappropriate due to the effect of noise.

As described above, with this embodiment, the representative color appropriate for the photographed image can be highly precisely extracted, and the color correction coefficient appropriate for the photographed image can be highly precisely calculated.

Second Embodiment

The first embodiment describes the method of removing the glossy portion from the photographed image if the object includes the glossy portion, extracting the representative color of the object, and generating the color correction parameter. This embodiment describes a method of generating a color correction parameter with high precision if a photographed image includes noise.

This embodiment describes the operation of an extraction judging unit that is different from the extraction judging unit 104 of the first embodiment, and omits description for the other operations equivalent to those of the first embodiment.

<Operation of Extraction Judging Unit (Step S4)>

Figure 11:
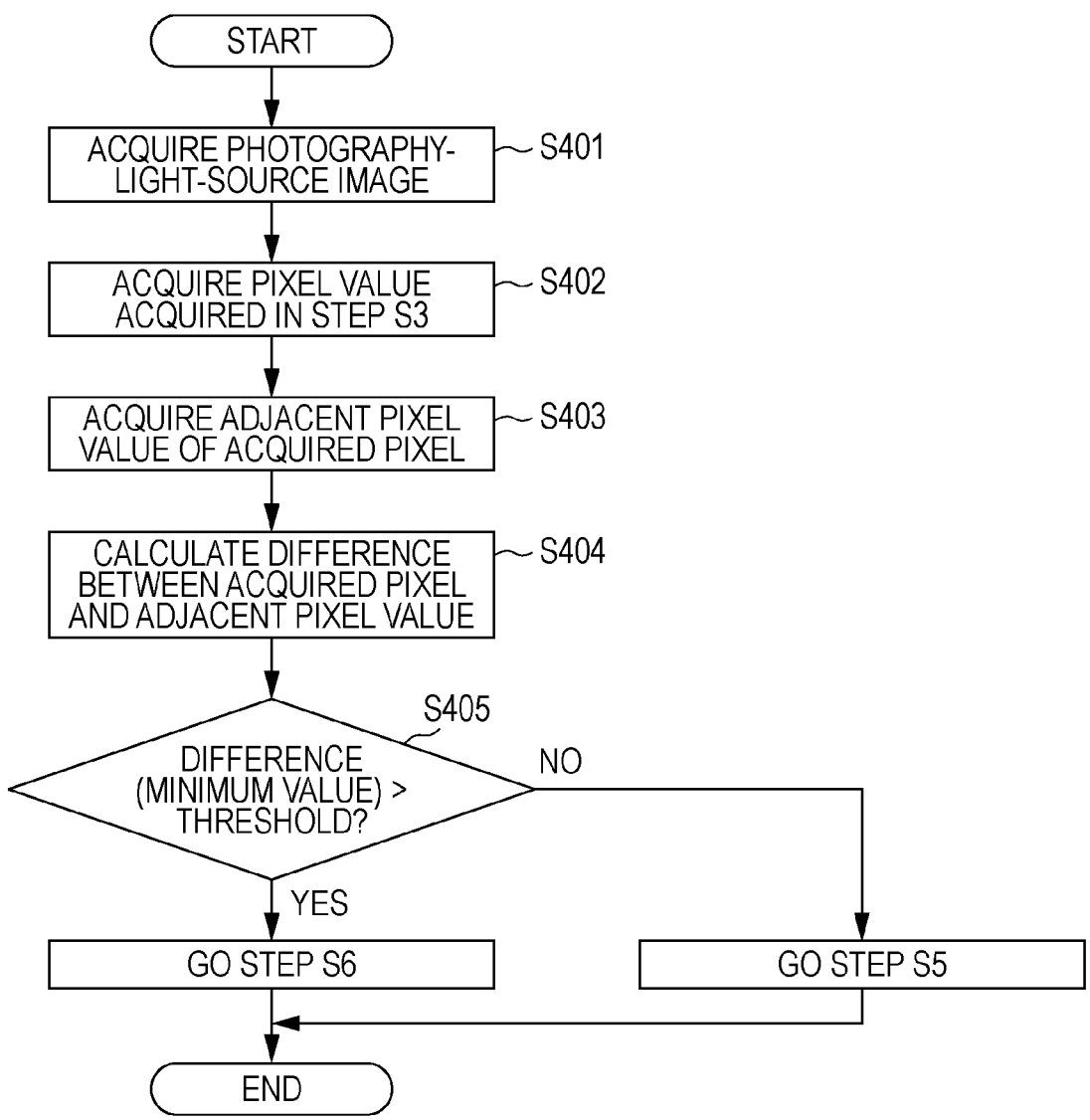
FIG. 11 is a flowchart of processing by an extraction judging unit 204 according to a second embodiment.

FIG. 11 is a flowchart of processing executed by the extraction judging unit in step S4 of FIG. 2.

In step S401, the photography-light-source image is acquired from the buffer 110. In step S402, the RGB values and the position coordinate (x, y) of the pixel acquired in step S3 are acquired. In step S403, an adjacent pixel value of a pixel adjacent to the acquired pixel is acquired with reference to the photography-light-source image and the position coordinate acquired in step S402. In this embodiment, pixels in a square range of 5 pixels long and 5 pixels wide excluding the acquired pixel are acquired as adjacent pixel values. However, the adjacent pixel value may be defined by a range including other number of pixels.

In step S404, a difference is calculated between the RGB values of the pixel value acquired in step S402 and RGB values of each of the adjacent pixel values acquired in step S403. In step S405, it is judged whether a minimum value of the differences calculated in step S404 is larger than a predetermined threshold. If the minimum value is larger than the threshold, the process goes to step S6. If the minimum value is equal to or smaller than the threshold, the process goes to step S5. In this embodiment, the threshold in step S405 uses a value of 30 for each value of R, G, and B (when 8-bit data of 0 to 255 is expected as an input image). However, other values may be used.

By performing the above processing, the noise is previously removed from the photographed image if the photographed image includes the noise, then the representative color of the object is extracted, and the color correction parameter is generated. Accordingly, the colors can be highly precisely matched with one another between the images photographed under the different light sources.

Third Embodiment

The first embodiment describes the method using the gloss mask image as the method for removing the glossy portion from the photographed image during the extraction of the representative color. This embodiment describes a method of designating a glossy region in the photographed image by a user through the UI, and determining the glossy portion based on a color of the designated region, as the method of removing the glossy portion from the photographed image.

Figure 14:
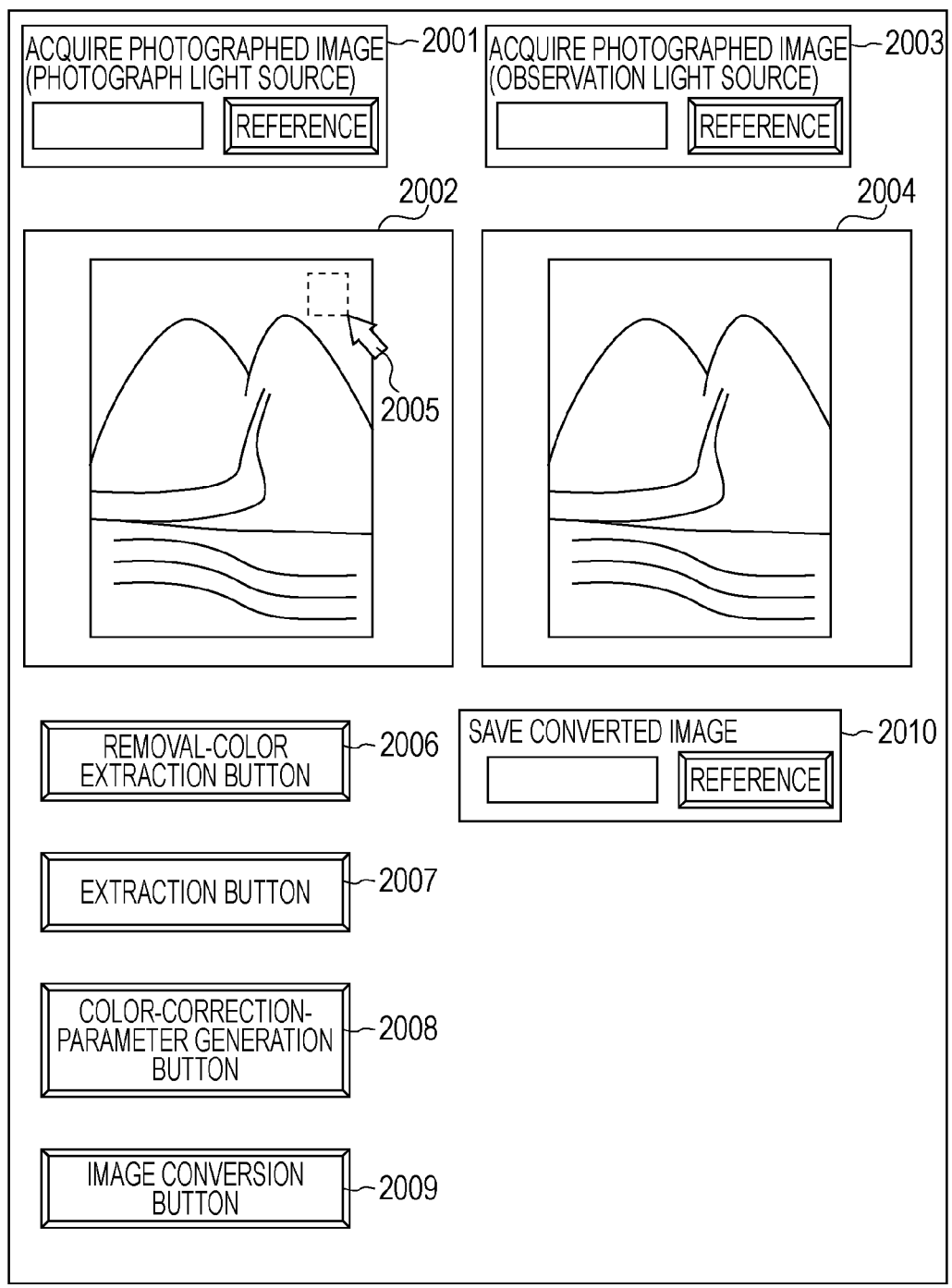
FIG. 14 is an illustration of a user interface that is displayed by the UI unit 109 according to the third embodiment.

This embodiment describes the operation of an extraction judging unit 304 that is different from the extraction judging unit 104 of the first embodiment and an interface in FIG. 14 displayed by the UI unit 109 that is different from that of the first embodiment, and omits description for the other operations equivalent to those of the first embodiment.

<Operation of Extraction Judging Unit 304 (Step S4)>

Figure 12:
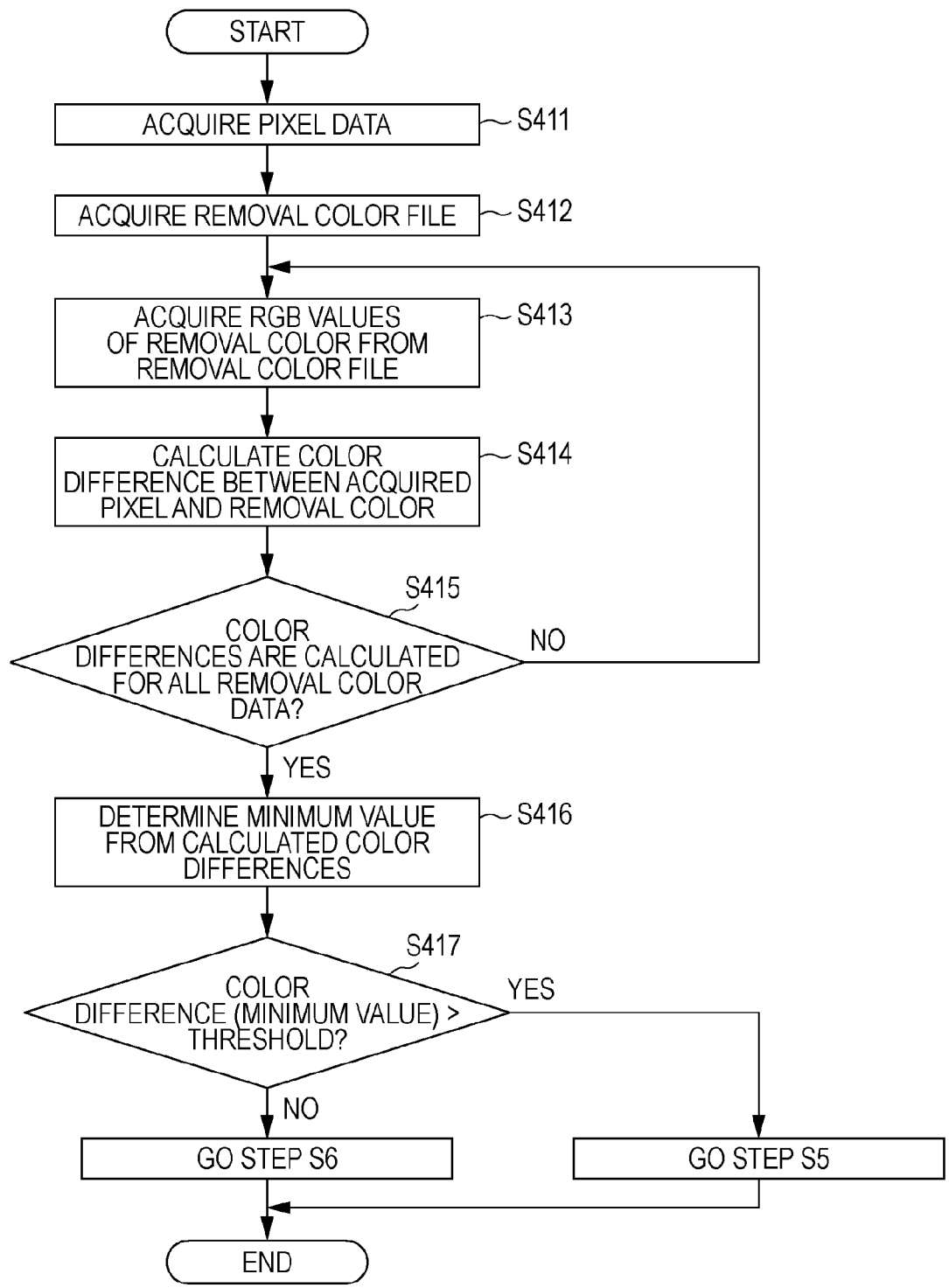
FIG. 12 is a flowchart of processing by an extraction judging unit 304 according to a third embodiment.

FIG. 12 is a flowchart of processing executed by the extraction judging unit 304 in step S4 of FIG. 2.

In step S411, the RGB values of the single pixel acquired in step S3 are acquired.

In step S412, a removal color file is acquired from the buffer 110. The removal color file is a file in which color data of a glossy portion is written. The form of the file is similar to that of the color extraction file shown in FIGS. 6A to 6C and used in the extraction-position determination processing in step S5. A method of generating the removal color file will be described later.

In step S413, RGB values of a removal color are acquired from the removal color file.

In step S414, the RGB values of the pixel acquired in step S411 and the RGB values of the pixel acquired in step S413 are converted into Lab values to calculate a color difference ΔE.

In step S415, it is judged whether color differences between the RGB values of the pixel acquired in step S411 and RGB values of all removal colors written in the removal color file are calculated. If the color differences are calculated for all removal colors, the process goes to step S416. If the color differences are calculated not for all removal colors, the process goes to step S413.

In step S416, a minimum value of the plural color differences is determined.

In step S417, the minimum value of the color differences is compared with a predetermined threshold. The threshold for judging the color difference is a value of 5 in this embodiment; however, another value may be used. If the minimum value of the color differences is larger than the threshold, the process goes to step S5. If the minimum value is equal to or smaller than the threshold, the process goes to step S6.

<Method of Generating Removal Color File>

Figure 13:
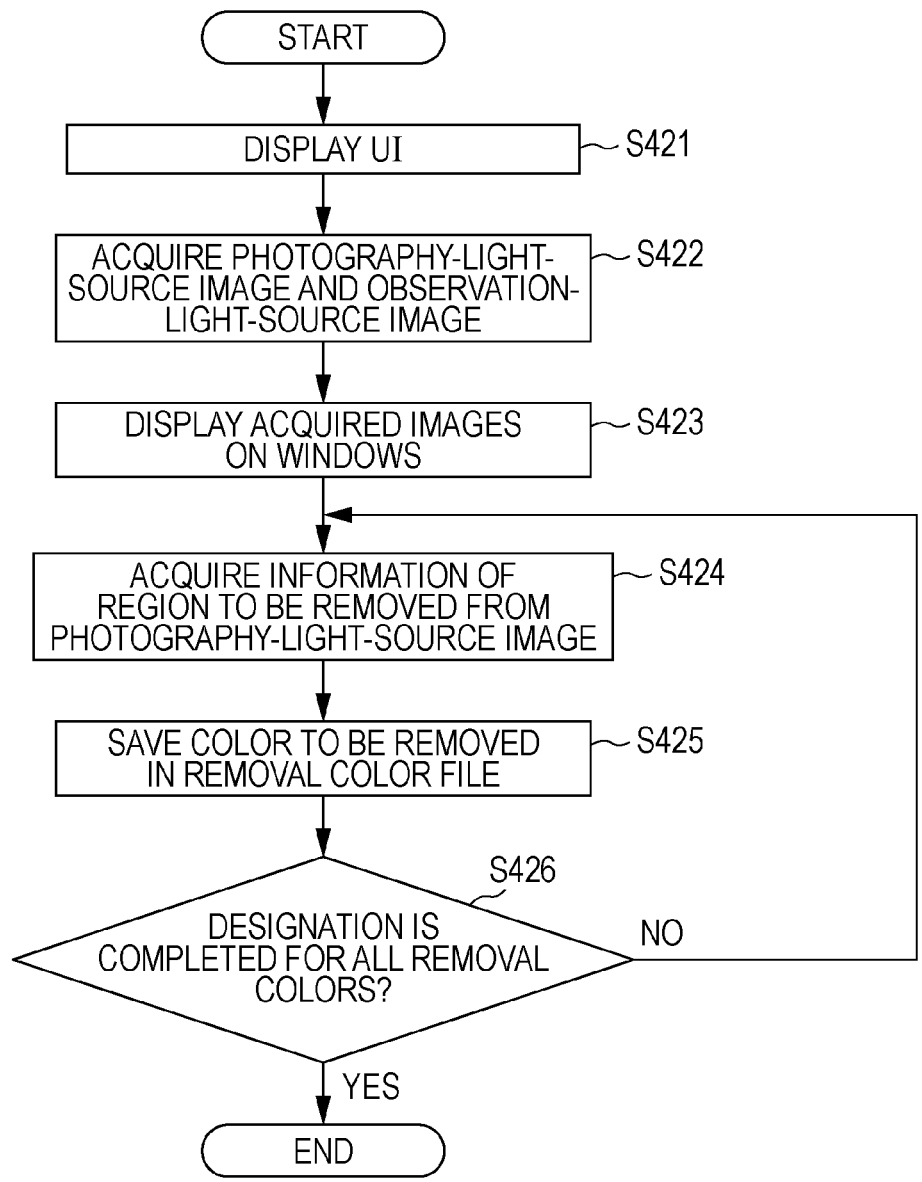
FIG. 13 is a flowchart of processing for generating a removal color file.

FIG. 13 is a flowchart relating to the method of generating the removal color file that is used by the extraction judging unit 304.

In step S412, the UI unit 109 displays a user interface shown in FIG. 14. An instruction input unit 2001 gives an instruction to indicate the photography-light-source image photographed under the photography light source. An image display unit 2002 causes the image indicated by the instruction input unit 2001 to be displayed on a window. An instruction input unit 2003 gives an instruction to indicate the photography-light-source image photographed under the observation light source. An image display unit 2004 causes the image indicated by the instruction input unit 2003 to be displayed on a window. A designating pointer 2005 designates a removal color from the photographed image. A removal-color extraction button 2006 gives an instruction for processing to extract a removal color from the photographed image. An extraction button 2007 gives an instruction for processing to extract a color from the photographed image. A color-correction-parameter generation button 2008 gives an instruction to generate a color correction parameter by using the extracted color data. An image conversion button 2009 gives an instruction to perform color correction for the photographed image by using the color correction parameter. An instruction input unit 2010 gives an instruction to store a file name when an image after image conversion is stored. The user interface shown in FIG. 14 is made by adding the functions 2002, 2004, 2005, and 2006 to the user interface shown in FIG. 3 and described in the first embodiment, in order to designate the region that the user wants to remove, such as the glossy region, from the photography-light-source image. The other functions of the user interface are similar to those described in the first embodiment.

In step S422, the photographed-image acquiring unit 103 acquires the photography-light-source image photographed under the photography light source and the observation-light-source image photographed under the observation light source, from the image-data holding unit 102, based on the image file names indicated by the instruction units 2001 and 2003.

In step S423, the UI unit 109 displays the images acquired in step S422 on the windows of 2002 and 2004.

In step S424, region information including the portion to be removed designated by the user with the designating pointer 2005 from the photography-light-source image displayed on the window of 2002 is acquired. In this embodiment, a rectangular region is designated by dragging the designating pointer from an upper left as a start point to a lower right as an end point. However, other designating method may be used as long as the region to be removed is efficiently designated.

In step S425, when the user presses the removal-color extraction button 2006, determination processing similar to the determination processing for the extraction position of the representative color described with reference to FIG. 5 is performed for each pixel data in the region designated in step S424, and determines the representative color of the region designated by the user. The determined representative color is saved in the removal color file. In FIG. 5, the determined representative color is saved in the color extraction file as the color to be extracted. However, in step S425, the determined representative color is saved in the removal color file as the color to be removed.

In step S426, it is judged whether the designation is ended by the user for all removal colors. If the designation is ended for all removal colors, the removal color file is saved in the buffer 110, and the processing for generating the removal color file is ended. If the designation is ended not for all removal colors, the processing in steps S424 and S425 is repeated to designate the region to be removed and to save the representative color of the designated region in the removal color file.

As described above, with this embodiment, a color similar to the removal color is removed from the extraction subject with reference to the removal color file that is previously generated in the extraction judgment processing in step S4. Thus, the color correction parameter can be highly precisely generated. In the method of generating the removal color file, the user may designate, for example, the glossy region from the photography-light-source image, and the color data in the region may be saved in the removal color file. Thus, the color that the user wants to remove can be appropriately processed.

Other Embodiments

<Operation of Extraction Judging Unit 104>

The first embodiment uses the method of extracting the glossy portion by using the difference between the directions of the flush light from the lamps while the camera and the object are fixed. However, the user may designate a gloss color in the photographed image, and generate a gloss mask image by using the color difference with respect to the designated gloss color. Alternatively, a gloss mask image may be generated from the photographed image by using photo-retouching software. The method is not particularly limited as long as the glossy portion is appropriately removed.

<Operation of Extraction Judging Unit 204>

In the operation of the extraction judging unit 204 according to the second embodiment, the noise is judged on the basis of whether one of the differences between the acquired pixel value and the adjacent pixel values in the predetermined range satisfies the threshold. However, other statistical values, such as a minimum value, an average value, a central value, or a modal value of the differences may be used for the judgment. Also, before the extraction judgment processing, or instead of the extraction judgment processing, a noise removing filter, such as a moving average filter or a median filter, may be used for the photographed image to remove the noise in advance. The method is not particularly limited as long as the noise portion is appropriately removed.

<Operation of Extraction-Range Determining Unit 106>

In the operation of the extraction-range determining unit 106 in the embodiments, the extraction range may be determined by analyzing the texture of the image by frequency analysis. For example, predetermined processing with a low-pass filter may be performed for the image. The extraction range may be determined by judging whether a peripheral pixel value around the extraction position is a pixel value in a band passing through the filter.

The present invention includes a software program that actualizes the functions of the embodiments (a program that executes the flowcharts shown in FIGS. 2, 4, 5, 7, and 9 to 13) when the program is supplied to a system or a device. Also, the present invention includes a recording medium storing the program readably by a computer in the system or the device when the program is run because codes in the program are read and executed.

With the present invention, since the color correction condition for the light source conversion is generated by using the representative color values extracted from the image, the color correction condition appropriate for the image can be generated. In addition, since the position of the pixel serving as the extraction subject and the extraction range are determined in accordance with the image, the color correction condition with high precision can be generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device comprising:
a memory;
a processor connected to the memory, wherein the processor is configured to control:
an acquiring unit configured to acquire first image data of a first photographed image photographed under a first light source and second image data of a second photographed image photographed under a second light source;
an extraction determining unit configured to determine a pixel serving as an extraction subject by using the first image data;
a determining unit configured to determine a first representative color value from the first image data and a second representative color value from the second image data, on the basis of an extraction range corresponding to the determined pixel;
a generating unit configured to generate a color correction condition for converting a color value depending on the first light source into a color value depending on the second light source, by using the first representative color value and the second representative color value; and a color correction unit configured to perform color correction for the first image data by using the color correction condition, wherein the extraction determining unit determines the pixel serving as an extraction subject by using the first image data, based on a designated removed region.

2. An image processing device comprising:

a memory;

a processor connected to the memory, wherein the processor is configured to control:

an acquiring unit configured to acquire first image data of a first photographed image photographed under a first light source and second image data of a second photographed image photographed under a second light source;

an extraction determining unit configured to determine a pixel serving as an extraction subject by using the first image data;

a determining unit configured to determine a first representative color value from the first image data and a second representative color value from the second image data, on the basis of an extraction range corresponding to the determined pixel;

a generating unit configured to generate a color correction condition for converting a color value depending on the first light source into a color value depending on the second light source, by using the first representative color value and the second representative color value; and a color correction unit configured to perform color correction for the first image data by using the color correction condition, wherein the extraction determining unit includes a removing unit configured to remove a glossy region from the first image data, and a determining unit configured to determine positions of a plurality of pixels serving as extraction subjects from a region other than the glossy region of the first image data.

3. An image processing device comprising:

a memory;

a processor connected to the memory, wherein the processor is configured to control:

an acquiring unit configured to acquire first image data of a first photographed image photographed under a first light source and second image data of a second photographed image photographed under a second light source;

an extraction determining unit configured to determine a pixel serving as an extraction subject by using the first image data;

a determining unit configured to determine a first representative color value from the first image data and a second representative color value from the second image data, on the basis of an extraction range corresponding to the determined pixel;

a generating unit configured to generate a color correction condition for converting a color value depending on the first light source into a color value depending on the second light source, by using the first representative color value and the second representative color value; and a color correction unit configured to perform color correction for the first image data by using the color correction condition, wherein the extraction-range determining unit determines the extraction range corresponding to the determined pixel on the basis of a statistical value of the color value of the pixel at the peripheral around the determined pixel.

4. The image processing device according to claim 3, wherein the statistical value is standard deviation of the color value of the pixel at the peripheral around the determined pixel.

* * * * *